Dec. 7, 1965  J. T. McNANEY  3,222,520
INFRARED RADIATION IMAGE CONVERTER
Filed March 11, 1963  2 Sheets-Sheet 2

INVENTOR.
Joseph T. McNaney

United States Patent Office 3,222,520
Patented Dec. 7, 1965

3,222,520
INFRARED RADIATION IMAGE CONVERTER
Joseph T. McNaney, 8548 Boulder Drive, La Mesa, Calif.
Filed Mar. 11, 1963, Ser. No. 264,368
2 Claims. (Cl. 250—71.5)

This invention relates to improvements in infrared radiation image converters wherein images in the form of radiation outside the visible spectrum are converted to images within the visible spectrum.

In this invention I utilize the radiant energy conducting efficiency of optical fibers being comprised of a core of infrared radiation conducting glass, and a jacket of infrared radiation conducting glass which is designed to have predetermined thickness dimensions for controlling the reflection of infrared radiation to photosensitive electrical circuit elements. In performing this function the jacket will also be designed to have an index of refraction which is lower than that of the core whereby radiation being admitted to one end of a fiber will be conducted to the opposite end after going through a series of internal reflections. However, by controlling the thickness dimensions of the jacket the photosensitive circuit elements will be made to respond to a predetermined spectrum of radiation.

The invention will include the use of large numbers of these optical fibers in the form of a panel wherein the fibers are supported in a side-by-side arrangement by means of a binder material, allowing a first end surface of the fibers to coincide with one surface of the panel and a second end surface of the fibers to coincide with the opposite surface of the panel. The binder material will be in the form of an electrical conductor for the purpose of simplifying the fabrication and operation of the image converter. In the process of fabricating the converter, binder material will be removed from between the fibers adjacent the second end surfaces thereof, so as to leave an open space intermediate the fibers extending a predetermined distance from the second end surfaces to the binder material. Within this open space there will be disposed a photoconductor material, extending from the second end surfaces of the fibers to the binder material. The photoconductor material will be intimately joined to the outer surface of the fibers and in a position to receive radiation therefrom for the purpose of extending a potential, selectively, from the binder material, to which a source of potential will be connected, to the second end surfaces of the fibers. For each fiber in the panel array there will be an independently controlled photosensitive circuit element.

Each of the circuit elements will be adapted to extend the influence of an electrical potential across a predetermined area of a layer of electroluminescent phosphor material in response to a predetermined spectrum of infrared radiation. The layer of phosphor will be adjacent the second end surfaces of the fibers, however, between this layer and the fibers there will be a layer of visible radiation shielding material to prevent radiation from the phosphor from entering the fibers. On the opposite surface of the phosphor layer there will be a layer of visible radiation transparent electrically conducting material and to which the source of potential will be connected.

As aforestated, it is an object of this invention to provide an infrared radiation image converter which is simple in construction, positive in operation, and capable of converting images outside the visible spectrum to images within the visible spectrum.

It is also an object of this invention to provide a converter of the type described having exceptionally high resolution capabilities.

Another object of this invention is to provide a converter means small enough to be incorporated in a binocular type of instrument for viewing infrared illuminated areas or objects under otherwise dark conditions.

A further object of this invention is to provide a converter means which lends itself to real-time information space communications systems.

Additional objects and advantages of the invention will become apparent from the following description when read in conjunction with the accompanying drawings in which.

Figure 1:
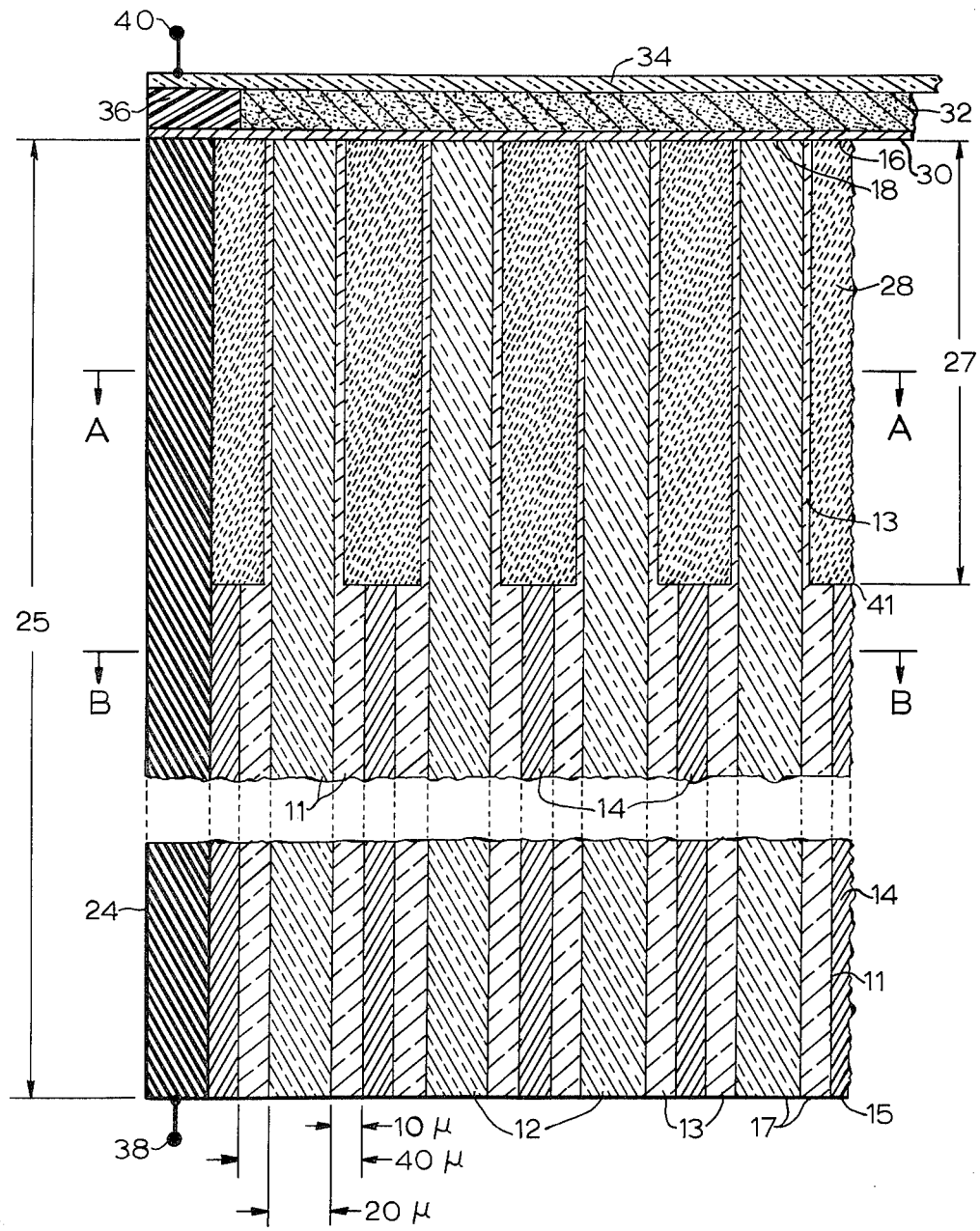
FIGURE 1 shows in a partial sectional view a preferred embodiment of my infrared radiation image converter.
Figure 2:
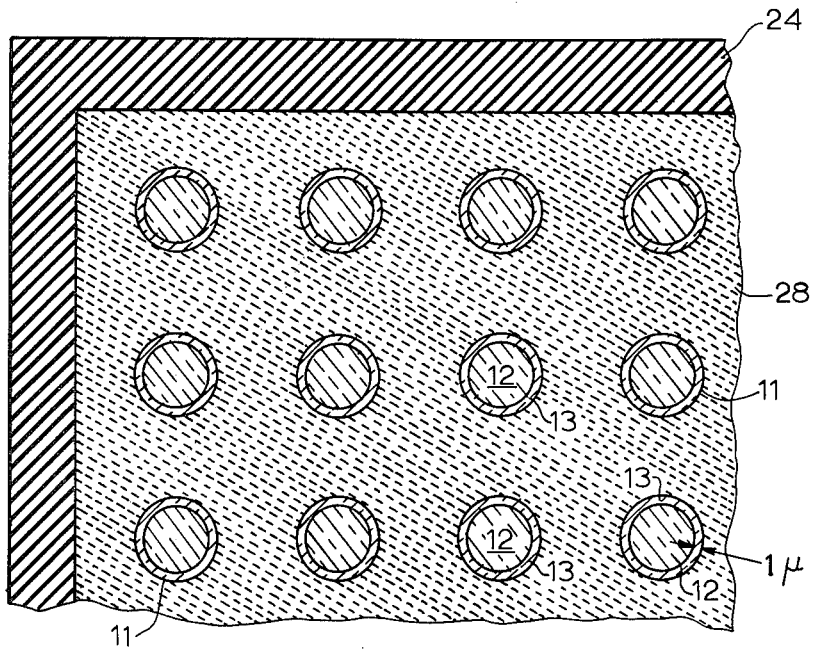
FIGURE 2 shows a section of FIGURE 1 through A—A.
Figure 3:
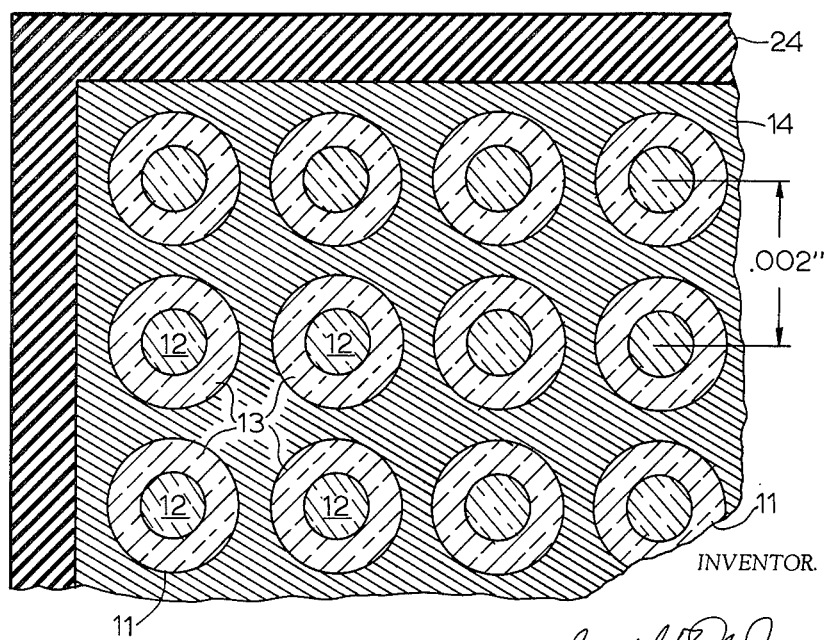
FIGURE 3 shows a section of FIGURE 1 through B—B.

Referring to the invention as illustrated in the drawings of FIGURES 1, 2 and 3, the image converter includes a plurality of optical fibers each comprising a core 12 and a jacket 13, and binder material 14 intermediate the fibers for supporting them in a spaced apart relationship to form a panel array of core 12 and jacket 13 assemblies. The panel array has a first surface 15 and a second surface 16, and each of the core 12 and jacket 13 assemblies have a first end surface 17 which coincide with the first panel surface 15 and a second end surface 18 coinciding with the second panel surface 16.

The optical fibers 11 are designed to have a core 12 which has a predetermined index of refraction, and a jacket 13 which has an index of refraction which is less than the index of the core 12. Although the fibers 11 are illustrated as being round in cross section, they may, of course, be square or of any other desired cross section. In either event, the fibers 11 will be designed to conduct infrared radiation, being admitted through one end surface 17, to the second end surface 18. To meet the objectives of this invention, however, the core 12 and jacket 13 will be made of materials capable of conducting infrared radiation of wave-lengths measuring between 1 and 8 microns. Accordingly, the core 12 and jacket 13 dimensions will be directly related to these wavelengths. The core 12 may, for example, be made of arsenic trisulfide glass with a jacket of a chemically related arsenic sulfide glass, which is capable of conducting radiation extending into the near-infrared, measuring 1 to 8 microns in wavelength.

Optical fibers of the type used in this invention are generally known and understood in the art as a means of transmitting radiant energy through fiber-like conductors, which can be drawn down to individual fiber dimensions of less than 25 microns in diameter. Core and jacket assemblies are drawn together to provide an extremely important fire-polished, contamination-free, interface at and along the juncture of the core and jacket. Under these conditions, a jacket of a lower index than the core will function as a very efficient reflector of radiant energy within the visible spectrum and into the infrared. The jacket thickness, of course, must be taken into consideration since wave energy is required to penetrate the jacket slightly more than a wavelength from the interface if it is to function as a reflector. In the present invention, therefore, the core 12 will have, for example, a diameter of 20 microns, and the jacket 13 will have a wall thickness of 10 microns. The overall dimensions of each fiber 11 will be 40 microns, which may be supported on center-to-center spacings of 0.002". Under these conditions as many as 250,000 fibers 11 may be supported within one square inch of panel area.

In the process of fabricating the image converter as illustrated in the drawings, a first step in the process will include binding together the plurality of fiber 11 to form a panel array of fibers 11 as hereinbefore set forth. A binder means in the form of an electrical conductor material 14 will be used for this purpose, in combination with a surrounding frame 24 of electrically conducting material. The binder means 14 may be in the form of any one of a number of polyester resins to which a metallic powder has been added to make such resins electrically conductive. This metallic powder may be in the form of graphite, alumina, etc., for example. Although polyester resins are essentially dielectric materials, thermoplastic formulations have been developed with resistivities less than $10^{-3}$ ohm-cm., as disclosed in the article entitled "Plastics Can Be Electrical Conductors," Elec. Mfg. (Nov. 1949). A second step in the process will include the grinding and polishing of the first panel surface 15, and the second panel surface 16, which also establishes a thickness dimension 25 of the panel of fibers 11, as well as the length dimension of the fibers 11.

The third step in the process of fabricating the converter involves the removal of binder material 14 from between the fibers 11, adjacent the second panel surface 16, so as to leave an open space intermediate the fibers 11 extending a predetermined distance 27 from the second panel surface 16. The removal of the binder material 14 will be accomplished by any of a number of well known electrolytic etching techniques; the object being to remove the material 14 without disturbing the dimensions of the fibers 11, and without necessarily etching away any of the surrounding frame 24, which may be preformed and composed of copper, brass, Babbitt metal or other forms of electrical conductor materials. The binder material 14, therefore, will be removed to a depth 27, extending from the second panel surface 16, for example, several thousandths of an inch.

A fourth step in the process will include the removal of all, or a portion, of the jacket 13 extending from the second end surfaces 18 of the fibers 11, the distance 27. This will be accomplished by means of any of several well known chemical etching processes. Instead of removing all of the jacket 13 from this portion of the fibers 11, it will be desirable to leave remaining a jacket thickness of approximately 1 micron, as indicated.

The fifth step will involve filling the open space between the fibers 11 with a photoconductor material, allowing the photoconductor material 28 to be intimately joined with the outer surface of each of the fibers 11. As illustrated, the photoconductor material 28 is intimately joined with the jacket 13 of each of the fibers 11, shown to have a thickness of 1 micron. The photoconductor material 28 may be selected from a number of well known solids such as lead sulfide, lead selenide, germanium, silicon, cadmium sulphide, or like materials, or combinations of such materials, either in their pure state or in a modified state.

After grinding and polishing the surface 16 of the panel to a smooth finish a layer 30 of visible radiation shielding material is disposed upon the second panel surface 16. This layer 30 will be about 2 or 3 microns thick and is designed to prevent the passage of visible light therethrough. Layer 30 may be composed of lampblack in a binder, such as a polyester resin. Upon the layer 30 there is disposed a layer 32 of electroluminescent phosphor particles of zinc-sulphide activated with copper or manganese dispersed in a dielectric media such as a low melting point glass, and upon this phosphor layer 32 there is a layer 34 of visible radiation transparent electrically conductive material. The phosphor layer 32 is thereby sandwiched between the conductor layer 34 and the second panel surface 16, leaving only the thickness of the shielding 30 between the layer 32 and the panel surface 16. However, a polyester resin electrical insulator material 36 is disposed upon the surface 16 adjacent the frame 24 for the purpose of insulating the phosphor layer 32, and also the conductor layer 34, from the surrounding frame 24.

The optically transparent electrically conductive material 34 is a relatively thin layer of a well known material produced by the Pittsburgh Plate Glass Co., under the manufacturers name of "Nesa" transparent conductive material. A terminal 38 is connected to the frame electrode 24, and a terminal 40 is connected to the conductor layer 34, so that a source of potential may be connected to converter when placed in operation.

When in operation, and a source of potential is applied to the terminals 38 and 40, however, the influence of this potential will be isolated from the phosphor layer 32 by the length dimension 27 of the photoconductor 28, until a source of radiant energy is exposed to the first end surfaces 17 of one or more of the fibers 11. As hereinbefore stated, the length dimension 27 will be several thousandths of an inch. The exact dimension, of course, will depend largely on the particular application of the converter, phosphor characteristics, etc. When one or more fibers 11 are exposed to a source of radiation, near-infrared for example, radiant energy will be conducted from the first end 17 to the second end 18 of the fibers 11 receiving radiation. Depending upon the area dimensions of the panel array, or the surface 15 adapted to receive radiation, the panel thickness 25 will vary from a few tenths of an inch to an inch or more. In any event, the infrared conducting core 12, in combination with the infrared conducting jacket 13, will permit infrared radiation to be reflected, and thereby conducted, through the core 12 and to the photoconductor material 28.

As illustrated, the fibers 11 are exemplified as having a core diameter of 20 microns and a jacket wall thickness of 10 microns, for the intended purpose of conducting radiant energy up to at least 8 microns wavelength. Considering the fact that radiant energy will penetrate the lower index jacket 13, beyond the interface of the core 12 and the jacket 13, slightly more than a wavelength before turning back in the direction of the fiber, the jacket wall thickness of 10 microns will be a factor in controlling the reflection of radiant energy through the fibers 11. Of course, the angle at which radiation enters a fiber 11, and the shifting from shallow angles to the more steep angles during the process of being reflected through the fiber 11, are also controlling factors. However, a converter utilizing core 12 and jacket 13 dimensions as shown, should be capable of conducting radiation to the photoconductor material up to wavelengths of 8 microns or more. Even though the fiber 11 material will be capable of conducting radiation of longer wavelengths, wavelengths much beyond 8 microns will penetrate the jacket 13 thickness of 10 microns and thereby absorbed by the binder material 14.

Since the jacket 13 wall thickness adjacent the photoconductor 28 is less than 10 microns, radiation being conducted to that end of the fibers 11 will encounter very little difficulty in penetrating the jacket 13 to thereupon illuminate the photoconductor material 28 which adjoins the outer surface of the jacket 13. A jacket 13 thickness of 1 micron or more adjacent the photoconductor material 28 will be used to place a low wavelength limit on radiation illuminating the material 28. By controlling the thickness of the jacket 13, therefore, the image converter of this invention will be made sensitive to a predetermined range of wavelengths.

The exposure of radiation to the first panel surface 15, within a spectrum for which the image converter has been designed, will allow the influence of an electrical potential appearing on the electrically conductive material 14 to be extended from the one end 41 of the photoconductor material 28 to the end adjacent the phosphor layer 32. The potential will, of course, be extended selectively to the phosphor 32, depending upon which fibers 11 in the array are being exposed to the radiation. The exposure of images of near-infrared to the first panel surface 15 will be converted to images of visible light, as viewed from the phosphor layer 32 through the transparent conductor 34, in accordance with the various intensities of the images and the spectral response characteristics of the converter.

Since the 1-micron jacket 13 thickness dimension adjacent the second end surfaces 18 of the fibers 11 is exemplary, it should be understood that this jacket thickness may be modified to meet the requirements necessary in carrying out the various objectives of this invention. Under certain operating conditions or application requirements it will be necessary to allow this portion of the jacket 13 to have a taper, whereby the thickness adjacent the one end 41 of the photoconductor material 28 will be several microns thick and tapering down to zero thickness adjacent the end surfaces 18 of the fibers 11. Or, a particular application may require the jacket 13 adjacent the photoconductor 28 to be removed entirely.

Although I have limited myself to the showing and descriptions of certain embodiments of the invention, it should be understood by those skilled in the arts that the invention is not to be limited in this regard, since many of the other embodiments embracing the general principles and construction hereinbefore set forth may be utilized, and still be within the ambit of the present invention.

The particular embodiments of the invention illustrated and described herein is illustrative only, and the invention includes such other modifications and equivalents as may readily appear to those skilled in the arts, and within the scope of the appended claims.

I claim:
1. In an image converter,
   (a) a plurality of radiant energy conducting fibers;
   (b) said fibers each having first and second end surfaces;
   (c) binder means intermediate said fibers for supporting said fibers in a spaced apart relationship to form a panel thereof and wherein said first end surfaces coincide with an outer surface of said panel;
   (d) a layer of electroluminescent material adjacent said second end surfaces and spaced apart therefrom;
   (e) a layer of visible radiation shielding material intermediate said second end surfaces and said electroluminescent material;
   (f) said fibers each having a longitudinal surface extending from said outer surface of the panel to said second end surfaces, and each longitudinal surface thereof having a first portion and a second portion;
   (g) said binder means being an electrical conductor material and being adjacent the first portion of each longitudinal surface;
   (h) photoconductor material, intimately joined with said second portion of each longitudinal surface, extending from said binder means to said shielding material; and
   (i) said fibers being adapted to control the reflection of infrared radiation from said outer surface of the panel to said photoconductor material.

2. In an image converter,
   (a) a plurality of radiant energy conducting fibers;
   (b) binder means intermediate said fibers for supporting said fibers in a spaced apart relationship to form a panel thereof;
   (c) said fibers each having first and second end surfaces;
   (d) said first end surfaces coinciding with an outer surface of said panel;
   (e) a layer of visible radiation shielding material disposed upon said second end surfaces and a layer of electroluminescent material disposed upon said shielding material;
   (f) each fiber of said panel having a longitudinal surface, consisting of first and second portions, extending from said outer surface of the panel to said second end surfaces;
   (g) said binder means being an electrical conductor material extending from said outer surface of the panel, along said first portion of each longitudinal surface, to said second portion of each longitudinal surface;
   (h) photoconductor material, intimately joined with said second portion of each longitudinal surface, extending from said binder means to said shielding material;
   (i) said fibers being adapted to control the reflection of infrared radiation from said outer surface of the panel to said photoconductor material; and
   (j) means for extending the influence of an electrical potential across said electroluminescent material upon said reflection of radiation from said outer surface to said photoconductor material.

References Cited by the Examiner
UNITED STATES PATENTS

| | | | |
|---|---|---|---|
| 2,970,239 | 1/1961 | Riggen | 313—108.1 |
| 2,985,784 | 5/1961 | MacNeille | 313—92 |
| 3,047,867 | 7/1962 | McNaney | 250—227 X |
| 3,110,816 | 11/1963 | Kaisler et al. | 250—83.3 |

OTHER REFERENCES

Darling et al.: RCA Technical Notes—RCA TN No. 368, June 1960 (2 pages).

RALPH G. NILSON, *Primary Examiner.*

MAYNARD R. WILBUR, CHESTER L. JUSTUS, *Examiners.*

ARCHIE R. BORCHELT, *Assistant Examiner.*